UNITED STATES PATENT OFFICE.

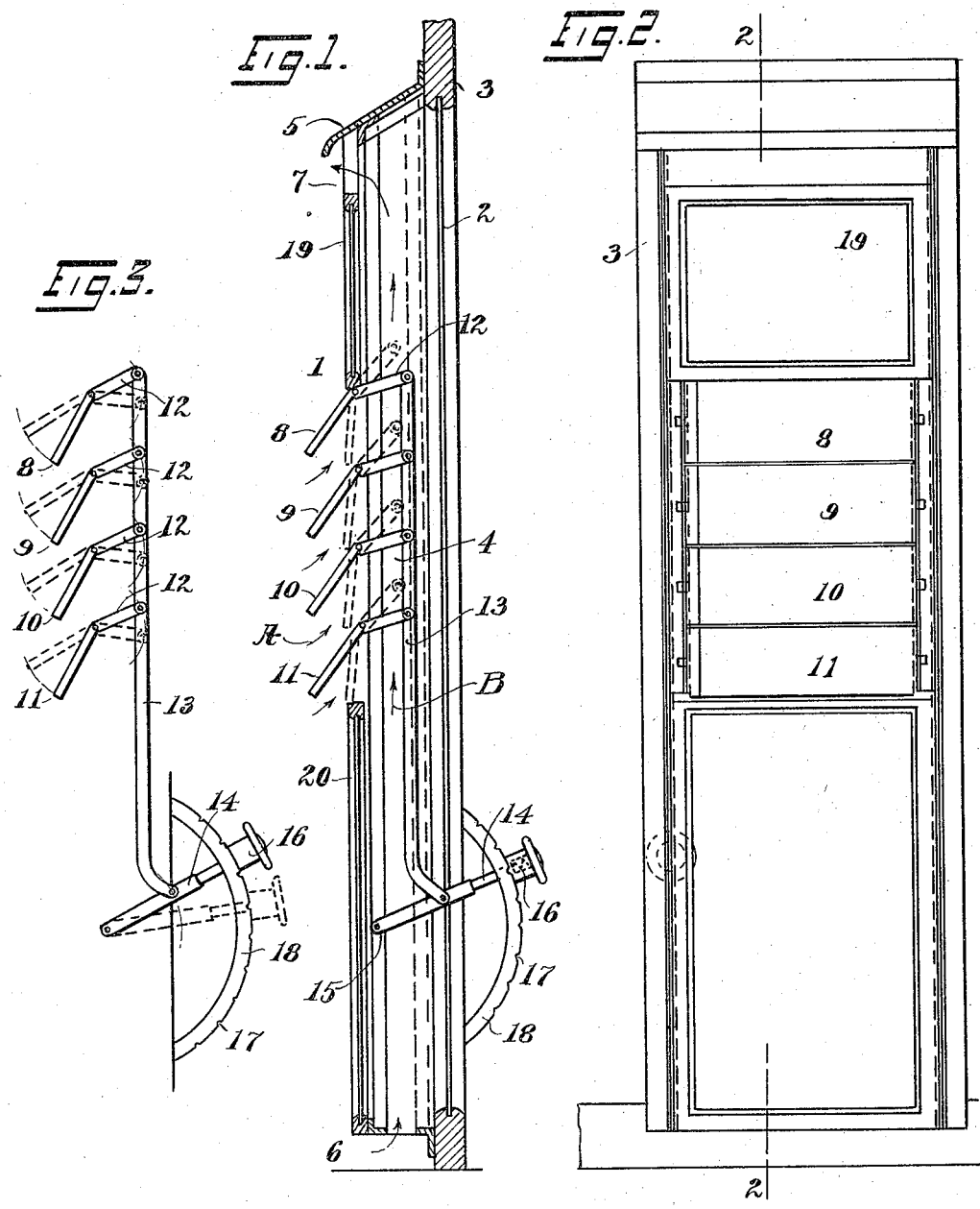

ALBERT THODE, OF HAMBURG, GERMANY.

FORCED-VENTILATION APPARATUS FOR VEHICLE-WINDOWS.

1,178,971.  Specification of Letters Patent.  Patented Apr. 11, 1916.

Application filed January 18, 1913. Serial No. 742,759.

*To all whom it may concern:*

Be it known that I, ALBERT THODE, a subject of the Emperor of Germany, residing in Hamburg, Germany, have invented certain new and useful Improvements in Forced-Ventilation Apparatus for Vehicle-Windows, of which the following is a specification.

The object of my invention is to save life and property and prevent suffering and loss by enabling me to make vehicle windows and especially car windows which, with minimum care, will not become clouded and obscured during cold and stormy weather, or by dust, but, while lighting the vehicle and protecting the driver, will never obstruct his view and thereby cause accident. To these ends I provide a car window adapted to utilize the dynamic laws governing the flow of air and its capacity as a vehicle for vapors and particles of matter, to cause air currents of regulable velocity to flow over the window panes and prevent them from becoming clouded or obscured.

In the drawings, Figure 1 is a section on line 2—2 of Fig. 2, Fig. 2 a front elevation and Fig. 3 a detail of the louver adjusting mechanism.

The embodiment of my invention chosen for illustration is a trolley or motor car front observation window. It insures the driver a clear view ahead, protects him from the weather and lights the car.

The frame 3, is adapted like a sash to be set in and close an opening in a car wall; and its faces contain outer and inner windows respectively 1 and 2, which, together with the side walls of its housing 5, inclose an air passage 4, provided with a lower air inlet 6, an upper outlet 7, and a shield 5ª, to prevent hail or driving rail from entering the air-passage 4.

The inner window 2 is illustrated as having a single pane.

The outer window 1 is divided into an upper sight or observation pane 19, a lower lighting pane 20 and a medial opening A communicating with the air passage 4 and controlled by adjustable louvers 8, 9, 10 and 11, which, the better to light the car, are made of glass. The upper louver 8, when inclined constitutes a deflector to cause air currents to flow across the face of the sight pane 19 and to that end is pivoted adjacent to its lower rail.

The louver adjustment mechanism is preferably, as illustrated, of the link-and-lever type. Like arms 12, fast to like angles to the several louvers, are linked by a common link 13 to a lever 14, pivoted at 15 and having in its head a detent 16 which can be engaged in one or other notch 17 of a sector 18, to fix the louvers in adjusted position.

My window constructed as set forth, when the car is running causes air currents which prevent obscuration of the inner window and sight pane.

When the car moves forward the air beneath it is measurably confined and rolled along between the car floor and the roadway, so that its rearward motion, relatively to the car, is very much less than, substantially only half the like relative motion of the unconfined air adjacent to the car sides and roof; further, the moving car displaces air, and in so doing causes upon its face an air pile whose density exceeds that of the surrounding atmosphere, is maximum at the center of gravity of the car face and is graduated substantially to normal at the edges thereof. It is well known that the erosive power of a fluid varies as the squares and its transporting capacity as the sixth power of its velocities.

My improved window functions, during its motion with the car, to utilize the above described laws and conditions to accelerate air; in still air to cause actual motion and in moving air to cause increased velocity, and to force air currents of such velocities through the air passage 4 and across the sight-pane 19. The acceleration of the air so increases its erosive and carrying powers that it will not only carry its primary burden, but will also pick up and carry away any moisture which might happen to be upon the surfaces with which it comes in contact. But hail, debris, and heavy rain drops may not be air-borne; they may be moving independently, with considerable momentum; and could enter the air passage 4 if it were not shielded. Therefore the shield 5ª is necessary, and being necessary, it is made with a depending lip 5ᵇ, and divergent relatively to the outlet 7, in order to increase the acceleration of the air and its suction, adjacent to said outlet. If cars were made for such windows their housings might be extended and their outlets 7 might discharge beyond the car roof or sides. But the windows must be applied to old cars; in which cases it is generally impracticable to locate the outlet otherwise than as illustrated. Such an arrangement is found highly satisfactory in practical railroading.

The inlet 6 being adjacent to the car floor, and the outlet 7 adjacent to its roof, where the motions of the air relatively to the car are respectively minimum and maximum, and moreover there being actual air movement due to displacement, and maximum and minimum at the same locations, and the friction and thereby induced suction being greatest where the relative motion is greatest, air is sucked out of the outlet 7, flows in at the inlet 6 and makes a current through the passage 4, as indicated by the arrow B, even when the louvers are closed; as they must be when car is bucking deep snow, to prevent it from clogging the air passage. The fact that the outlet is in the car face does not prevent issuing currents and displacement thereby of a part of the air into which the car is running; for, whether the atmosphere be still or in motion, the velocity and momentum of said issuing air exceeds, by amounts due to the motion of the car, the velocity and momentum (if there be any) of the air which it displaces. Suppose, for example, that the atmosphere is still, the car is running 10 feet per second and that its motion causes a current of four and a half feet per second vertically through the passage 4; the air in said passage moves forward with the car as well as vertically, and its actual motion is substantially 11 feet per second along the hypotenuse of a right angled triangle whose base measures 10 and whose height is 5 feet. As such air is actually moving faster than the car, it can discharge from the car face; and the air in front of the car will not prevent such discharge because its only actual motion is transverse, due to its displacement. If the car were running into the wind, the wind would increase the velocity of the issuing current, whose velocity and momentum would be the sum of remainders of the primary or wind velocity and momentum, plus those due to the car's motion; and the issuing current would continue. Said current will keep unobscured the passage faces of the panes, 2, 20 and 19, over which it passes.

When cars equipped with the usual front window drive into moisture-laden or saturated atmosphere, the air, piling on the panes, and temporarily losing its velocity, loses also its carrying capacity and deposits its burden on the glass. To prevent such clouding on the face of my sight pane 19, I hinge adjacent to its bottom rail the upper louver 8, which, when inclined, constitutes a deflector and deflects across the sight pane an air current which cleanses it of moisture and will generally protect it.

The above statement of actual velocities shows very clearly that when the car runs into very high head winds and precipitation, it may be desirable to increase the velocity of the issuing current. I therefore provide the medial opening A, the louvers 8—11 and their adjusting mechanism. If it were necessary to keep the lighting pane 20 clear (which it is not) I would locate the louvers below or another deflector adjacent to it. But since the driver looks only through the sight pane, and the lighting pane will light the car even when considerably obscured, I make the sight pane of size and height proper for its use and locate the louvers medially; and make them of glass the better to light the car.

To give the maximum range and efficiency to the apparatus, the louvered opening A is located substantially on the center of gravity of the car face, where the air density due to the drive of the car is maximum. When the driver wishes to increase the velocity of the protective air currents he moves the louvers toward 45° dip, at which declination their efficiency and the current velocities are maximum; the louvers, as the car drives them into the air, deflect it into and upward through the passage 4, with an acceleration whose limit is the velocity of the car itself. The velocity due to this cause may be increased by the suction of the relatively back-rushing atmosphere.

If the acceleration due to the apparatus gave car-speed to the current through the air passage, then with still atmosphere, the actual motion of the air current would be 1.414 times car speed up the hypotenuse of an isosceles right angled triangle.

Having thus described my invention, I claim:

1. In combination with a vehicle having a window in its front wall, a housing in front of said window inclosing an air passage provided with an opening at its upper end, there being an opening at its lower end of substantially the same size as said upper opening, a transparent member disposed below said upper opening, and there being a plurality of intermediate openings each of substantially the same size as said upper opening, deflectors in said intermediate openings to deflect the incoming air through said air passage in an upward direction, so that the aggregate forces composed of the naturally ascending air in front of a moving vehicle and the upwardly impelled forces created by said deflectors will overpower the force of air that would tend to come in through said upper opening and thereby force the air out of said upper opening.

2. In combination with a vehicle having a window in its front wall, a housing in front of said window inclosing an air passage and provided with an opening at its upper end, there being an opening at its lower end, a transparent member disposed below said upper opening, there being a plurality of intermediate openings disposed below said transparent member, deflectors in said intermediate openings to deflect the incoming air through said air passage in an upward direction, said deflectors being pivotally mounted in said housing, and means for regulating the inclination of said deflectors.

3. In combination with a vehicle having a window in its front wall, a housing in front of said window inclosing an air passage provided with an opening at its upper end, there being an opening at its lower end of substantially the same size as said upper opening, a transparent member disposed below said upper opening, there being a plurality of intermediate openings each of substantially the same size as said upper opening and disposed below said transparent member, deflectors in said intermediate openings to deflect the incoming air through said air passage in an upward direction, so that the aggregate forces composed on the naturally ascending air in front of a moving vehicle and the upwardly impelled forces created by said deflectors will overpower the force of air that would tend to come in through said upper opening and thereby force the air out of said upper opening, and means for regulating the inclination of said deflectors.

ALBERT THODE.

Witnesses:
HAROLD D. PENNEY,
JOHN MORRIS.

Copies of this patent may be obtained for five cents each, by addressing the "Commissioner of Patents, Washington, D. C."